(12) United States Patent
Dion et al.

(10) Patent No.: US 7,329,703 B2
(45) Date of Patent: Feb. 12, 2008

(54) POLYMERIZED MACROCYCLIC OLIGOMER NANOCOMPOSITE COMPOSITIONS

(75) Inventors: Robert P. Dion, Horgen (CH); David H. Bank, Midland, MI (US); Martin C. Beebe, Standish, MI (US); Parvinder Walia, Midland, MI (US); Peter C. LeBaron, Midland, MI (US); James D. Oelberg, Saginaw, MI (US); Mark A. Barger, Midland, MI (US); Michael S. Paquette, Midland, MI (US); Michael D. Read, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 394 days.

(21) Appl. No.: 10/742,290

(22) Filed: Dec. 19, 2003

(65) Prior Publication Data

US 2005/0059768 A1    Mar. 17, 2005

Related U.S. Application Data

(60) Provisional application No. 60/435,170, filed on Dec. 20, 2002.

(51) Int. Cl.
*C08K 3/34* (2006.01)
(52) U.S. Cl. .................. 524/449; 524/445
(58) Field of Classification Search ............... 524/445, 524/447, 449
See application file for complete search history.

(56) References Cited

U.S. PATENT DOCUMENTS

| | | | |
|---|---|---|---|
| 4,740,583 A | 4/1988 | Brunelle et al. | |
| 4,810,734 A | 3/1989 | Kawasumi et al. | 523/216 |
| 5,039,783 A | 8/1991 | Brunelle et al. | 528/272 |
| 5,191,013 A | 3/1993 | Cook et al. | 524/601 |
| 5,214,158 A | 5/1993 | Brunelle et al. | 549/267 |
| 5,231,161 A | 7/1993 | Brunelle et al. | 528/272 |
| 5,281,669 A | 1/1994 | Kambour et al. | 525/177 |
| 5,300,590 A | 4/1994 | Cook et al. | 524/444 |
| 5,321,117 A | 6/1994 | Brunelle | 528/272 |
| 5,348,985 A | 9/1994 | Pearce et al. | 521/124 |
| 5,356,984 A | 10/1994 | Carbone et al. | 524/431 |
| 5,386,037 A | 1/1995 | Takekoshi et al. | 549/206 |
| 5,387,666 A | 2/1995 | Taekoshi et al. | 528/283 |
| 5,389,719 A | 2/1995 | Takekoshi et al. | 524/784 |
| 5,407,984 A | 4/1995 | Brunelle et al. | 524/178 |
| 5,434,244 A | 7/1995 | Warner et al. | 528/490 |
| 5,446,122 A | 8/1995 | Warner et al. | 528/279 |
| 5,466,744 A | 11/1995 | Evans et al. | 524/714 |
| 5,498,651 A | 3/1996 | Brunelle | 524/176 |
| 5,527,976 A | 6/1996 | Takekoshi et al. | 585/16 |
| 5,530,052 A | 6/1996 | Takekoshi et al. | 524/447 |
| 5,547,984 A | 8/1996 | Sharma | 514/541 |
| 5,591,800 A | 1/1997 | Takeokoshi et al. | 524/783 |
| 5,648,454 A | 7/1997 | Brunelle | 528/491 |
| 5,661,214 A | 8/1997 | Brunelle et al. | 524/783 |
| 5,663,282 A | 9/1997 | Todt et al. | 528/274 |
| 5,668,186 A | 9/1997 | Brunelle et al. | 521/48 |
| 5,707,439 A | 1/1998 | Takekoshi et al. | 106/483 |
| 5,710,086 A | 1/1998 | Brunelle et al. | 502/171 |
| 5,756,644 A | 5/1998 | Hodge et al. | 528/272 |
| 5,795,423 A | 8/1998 | Johnson et al. | 156/166 |
| 5,973,053 A | 10/1999 | Usuki et al. | |
| 6,156,835 A | 12/2000 | Anderson et al. | 524/445 |
| 6,409,949 B1 | 6/2002 | Tanaka et al. | 264/102 |
| 6,420,047 B2 | 7/2002 | Winckler et al. | 428/480 |
| 6,436,549 B1 | 8/2002 | Wang | 428/480 |
| 2002/0098309 A1 | 7/2002 | Bargrodia et al. | 428/36.9 |
| 2004/0106713 A1 | 6/2004 | Avakian | |
| 2005/0288420 A1* | 12/2005 | Paquette et al. | 524/445 |
| 2006/0003887 A1* | 1/2006 | Paquette et al. | 501/141 |
| 2006/0004135 A1* | 1/2006 | Paquette et al. | 524/445 |

FOREIGN PATENT DOCUMENTS

EP    1111012 A2    6/2001

(Continued)

OTHER PUBLICATIONS

Singh et al. U.S. Appl. No. 60/152,515. "High-Temperature Use Nanocomposites". Available online at <http://ofi.epoline.org/view/GetDossier?dosnum=&lang=EN> as priority document filled for WO 00/78540.*

(Continued)

*Primary Examiner*—Peter Szekely
(74) *Attorney, Agent, or Firm*—Norman L Sims

(57) ABSTRACT

The invention relates to polymers derived from macrocyclic oligomers containing organo clay fillers comprising a) a polymer derived from a macrocyclic oligomer; b) clay platelets; and c) the residue of one or more onium compounds having at least one ligand with a $C_5$ or greater carbon chain and at least one ligand containing one or more functional groups having one or more active hydrogen atoms wherein the functional group is reactive with the macrocyclic oligomer and/or functional groups formed when the macrocyclic oligomer decyclizes wherein a portion of one or more of the onium compounds is ironically bound to the clay platelet and covalently bonded to the polymers derived from macrocyclic oligomers. The invention also relates to processes for preparing such compositions. Furthermore, the invention relates to articles prepared from organoclay filled polymer compositions.

23 Claims, No Drawings

FOREIGN PATENT DOCUMENTS

WO 00/24818 A 5/2000
WO 00/78540 A 12/2000

OTHER PUBLICATIONS

Du Pont. Hytrel, Engineering Thermoplastic Elastomer Injection Molding Guide. p. 6. Available online at <http://plastics.dupont.com/plastics/pdflit/europe/hytrel/HYTMGe.pdf?GXHC_gx_session_id_=759b7085823d5719&GXHC_local e=en_US>.*

Search Report for PCT/US03/41476.*

Bénédicte Lepoittevin et al., Poly(ε-Caprolactone)/Clay Nanocomposites Prepared by Melt Intercalation: Mechanical, Thermal and Rheological Properties, Polymer 43 (2002) 4017-4023, Mar. 22, 2002, Elsevier, Belgium.

Dana Kubies et al., Controlled Ring-Opening Polymerization of ε-Caprolactone in the Presence of Layered Silicates and Formation of Nanocomposites, Macromolecules 2002, 35, 3318-3320, American Chemical Society, Belgium.

Bénédicte Lepoittevin et al., Poly(ε-Caprolactone)/Clay Nanocomposites by in-Situ Intercalative Polymerization Catalyzed by Dibutyltin Dimethoxide, Macromolecules 2002, 35, 8385-8390, American Chemical Society, Belgium.

Xinyu Huang et al., Synthesis of Polycarbonate-Layered Silicate Nanocomposites Via Cyclic Oligomers, macromolecules 2000, 33, 2000-2004, American Chemical Society, WPAFB, Ohio.

Bénédicte Lepoittevin et al., Polymer/Layered Silicate Nanocomposites by Combined Intercalative Polymerization and Melt Intercalation: A Masterbatch Process, Polymer 44, (2003) 2033-2040, Belgium; Elsevier.

Cher H. Davis et al., Effects of Melt-Processing Conditions on the Quality of Poly(Ethylene Terephthalate) Montmorillonite Clay Nanocomposites, Journal of Polymer Science: Part B: Polymer Physics, vol. 40, 2661-2666 (2002), Wiley Periodicals, Inc.

Baohua Guo et al., Chain Extension of Poly(Butylene Terephthalate) by Reactive Extrusion, Journal of Applied Polymer Science, vol. 71, 1827-1834 (1999), John Wiley & Sons, Hong Kong.

Bruno Fortunato et al., Solid State Polycondensation of Poly(Butylene Terephthalate), Polymer, vol. 22, May 1981, 655-657, Italy, IPC Business Press.

C. Gostoli et al., Chemical Kinetics and Diffusion in Poly(Butylene Terephthalate) Solid-State Polycondensation: Experiments and Theory, Journal of Applied Polymer Science, vol. 29, 2873-2887 (1984); John Wiley & Sons, Italy.

* cited by examiner

POLYMERIZED MACROCYCLIC OLIGOMER NANOCOMPOSITE COMPOSITIONS

CROSS REFERENCE TO RELATED APPLICATION

This application claims the benefit of U.S. Provisional Application No. 60/435,170, filed Dec. 20, 2002.

FIELD OF INVENTION

The invention relates to polymers derived from macrocyclic oligomers containing organo clay fillers. The invention also relates to processes for preparing such compositions. Furthermore, the invention relates to articles prepared from organoclay filled polymer compositions.

BACKGROUND OF INVENTION

Macrocyclic oligomers have been developed which form polymeric compositions with desirable properties such as strength, toughness, high gloss and solvent resistance. Among preferred macrocylic oligomers are macrocyclic polyester oligomers such as those disclosed in U.S. Pat. No. 5,498,651, incorporated herein by reference. Such macrocyclic polyester oligomers have desirable properties in that they are excellent matrices for polymer composites because they exhibit low viscosities when compared to other polymers and precursors to polymers, which facilitate good impregnation and wet out in composite applications. Furthermore, such macrocyclic oligomers are easy to process using conventional processing techniques. The polymers prepared from macrocyclic oligomers are characterized by a unique combination of chemical, physical and electrical properties. In particular, they are chemically stable and display high impact strengths. Nevertheless, for certain applications such polymer compositions do not have acceptable heat deflection temperatures for applications where the polymers are exposed to high temperatures. Therefore, nanocomposites of such materials have been developed wherein layered clay platelets are dispersed in the polymeric matrix. Such compositions are disclosed in U.S. Pat. No. 5,530,052, incorporated herein by reference. Despite such advances in technology, nanocomposites prepared from macrocyclic oligomers have not been able to meet all of the desired property parameters in which those skilled in the art desire to use them.

What is needed are polymeric compositions which have even higher heat distortion temperatures than presently available. Furthermore, higher modulus is required of such compositions along with improved ductility. Frequently, the addition of filler to a polymer composition increases the brittleness of articles made from the composition. Nanocomposites with improved ductility are needed. It is often difficult to get good dispersion of clay platelets in a polymeric matrix. It is desired to develop a nanocomposite composition with improved dispersion of clay platelets in the polymeric matrix. It is also desired to prepare articles from thermoplastic materials which demonstrate the advantages inherent in the thermoplastic materials which also contain or display high heat deflection temperatures and can be prepared using conventional processes and equipment.

SUMMARY OF INVENTION

The invention is a composition comprising
a) a polymer derived from a macrocyclic oligomer;
b) clay platelets; and
c) the residue of one onium compound having at least one ligand with a $C_5$ or greater carbon chain and at least one ligand containing a functional group having at least one active hydrogen atom wherein the functional group is reactive with functional groups formed when the macrocyclic oligomer decyclizes wherein a portion of the onium compounds is ionically bound to the clay platelet and covalently bonded to the polymers derived from macrocyclic oligomers.

In yet another embodiment the composition further comprises the residue of a polyfunctional chain extender compound which is bonded to two or more polymer chains wherein the polyfunctional chain extender comprised two or more functional groups which are reacted with functional groups formed by decyclization of the macrocyclic oligomer. The inclusion of the polyfunctional chain extender compound results in polymers having significantly higher molecular weights. In another embodiment the invention relates to such polymer composition which further contains the residue of one or more polyfunctional polymers which are derived from polyfunctional polymers having two or more functional groups which are reactive with the functional groups formed by decyclization of the macrocyclic oligomer. In yet another embodiment the invention relates to such polymeric compositions which further comprise rubbers to improve the toughness of the composition.

In yet another embodiment the invention is a method of preparing a composition comprising
a) contacting clay platelets capable of ion exchange with one or more onium compounds having at least one ligand with a $C_5$ or greater carbon chain and at least one ligand containing an active hydrogen-containing functional group, under conditions such that the clay platelets undergo ion exchange to form ionic bonds on the surface of the clay platelets between anionic sites on the clay surface and the cationic site of the onium compound;
b) removing substantially all of the water present in the ion exchanged clay platelets;
c) contacting the ion exchanged clay platelets with macrocyclic oligomers at a temperature below the temperature at which the macrocyclic oligomers undergo polymerization under conditions such that the macrocyclic oligomers increase the spacing between the associated clay platelets (intercalate);
d) contacting the composition with a catalyst capable of polymerizing the macrocyclic oligomer, exposing the composition to a temperature at which the macrocyclic oligomers decyclize and undergo polymerization and the clay platelets undergo exfoliation, (randomly disperse in the polymer matrix).

In yet another embodiment the invention relates to processes wherein a polyfunctional polymer having two or more active hydrogen-containing functional groups is added to the composition before the catalyst for polymerization of the macrocyclic oligomer is added. In yet another embodiment a polyfunctional chain extender compound is added to the composition prior to polymerization of the macrocyclic oligomer. In yet another embodiment such as a core shell rubber is added to the composition after polymerization of the macrocyclic oligomer.

The compositions of the invention demonstrate excellent heat distortion temperatures, stiffness, toughness, heat resistance and ductility. The compositions also demonstrate excellent dispersion of nanocomposites in the polymer matrix. The compositions of the invention also process to make various useful articles using conventional processes and equipment.

DETAILED DESCRIPTION OF THE INVENTION

In general, the invention relates to clay platelet reinforced thermoplastic composites derived from macrocyclic oligomers. More particularly, the clays are very tiny platelet particles which are dispersed in the polymer matrix resulting in formulations commonly referred to as nanocomposites. The polymer matrix is formed by polymerization of macrocyclic oligomers after the macrocyclic oligomers have undergone decyclization to form reactive groups which are capable of polymerization. The clay platelets used in the invention are reacted, via ion exchanged, with an onium compound having at least one relatively long carbon chain, five carbons or greater, and at least one other ligand which contains a functional group which is reactive with the macrocyclic oligomers and/or the decyclized macrocyclic oligomers. Thus, the formed compositions have the clay platelets ionically bonded to such onium compound and such onium compound further bonded in a covalent manner to a portion of the polymer matrix derived from the macrocyclic oligomers. Preferably, the clay platelets are completely exfoliated. Exfoliation used herein means that the clay platelets are dispersed in the polymer matrix in a random fashion. As produced, clay platelets are a series of associated layers of clay. In order to have the maximum advantage of a nanocomposite which is the reinforcement of the polymer matrix with very high surface area reinforcing compounds, it is necessary to partially or completely disassociate the clay platelets and randomly disperse them in the polymer matrix. The process for achieving such random dispersion is frequently referred to as exfoliation. Preferably, the average distance between individual clay platelets is about 30 angstroms or greater, more preferably about 35 angstroms or greater, even more preferably 40 angstroms or greater and more preferably 50 angstroms or greater. An improved distribution of nanocomposite particles in a polymer matrix results in improved modulus and stiffness of the composition. Preferably, the amount of nanocomposite and its level of dispersion is such that the polymer composition exhibits a modulus increase of 10 percent or greater, more preferably 100 percent or greater and most preferably 400 percent or greater.

One problem with stiffening a polymer matrix with a filler such as a nanocomposite is the presence of the filler can negatively impact the toughness of the composition. In one embodiment of the invention a polyfunctional polymer which comprises a polymeric chain having at least two functional groups which are reactive with the decyclized macrocyclic oligomers is added to the composition. In this embodiment preferably the molecular weight of the polyfunctional polymer is about 2000 or greater (weight average molecular weight), more preferably about 5000 or greater and most preferably about 10,000 or greater.

Preferably, the total molecular weight of the macrocyclic oligomer-based polymer containing the polyfunctional polymer is about 20,000 or more (weight average molecular weight), more preferably about 80,000 or more and most preferably about 120,000 or more.

Preferably, this polymer has a low glass transition temperature. Preferably, the polymer is chosen, and the amount is chosen to give desired ductility properties. Preferably, such polymer composite exhibits a ductility increase of about 50 percent or greater, more preferably about 200 percent or greater and most preferably about 500 percent or greater. Preferably, the ductility is about 50 inch/lbs or greater, more preferably about 150 inch/lbs or greater and most preferably about 300 inch/lbs or greater. Where the polyfunctional polymer exhibits a low glass transition temperature, the polymeric composite may exhibit two phases which are linked together through covalent bonds. One phase will comprise primarily the polymer derived from the macrocyclic oligomers, and the other phase will comprise primarily the low glass transition polymer phase. The clay platelet reinforcing agents can be found in the macrocyclic oligomer phase.

Under certain conditions, the polymer formed may have lower molecular weight than desired for certain applications. In one embodiment of the invention, the polymer composition further comprises a polyfunctional chain extending compound which functions to react with two or more terminal ends of a macrocyclic oligomer chain to therefore form higher molecular weight polymers in the polymeric matrix.

In another embodiment the polymer matrix may not be sufficiently ductile for desired used. In order to improve the toughness of the resulting polymer compositions, rubbers may be added to the composition to improve the toughness. Generally, toughness is measured by measuring the dart impact. Preferably, the toughness is exhibited by a dart impact (according to ASTM D3763-99) of about 50 inch/lbs or greater, more preferably about 150 inch/lbs or greater and most preferably about 300 inch/lbs or greater.

The macrocyclic oligomers which may be used in this invention include any macrocyclic oligomers which can undergo decyclization and polymerization under reasonable conditions to form a thermoplastic polymer matrix. As used herein, a macrocyclic molecule means a cyclic molecule having at least one ring within its molecular structure that contains eight or more atoms covalently connected to form the ring. As used herein, an oligomer means a molecule that contains two or more identifiable structural repeat units of the same or different formula. A macrocyclic oligomer may also be a co-oligomer or multi-oligomer, that is an oligomer having two or more different structural repeat units within one cyclic molecule. The decyclization means herein the breaking a cyclic ring structure to form a structure having at least two end groups. In the context of this invention, such decyclization generally results in the formation of a compound having one or more, preferably two or more reactive functional groups through which polymerization can take place.

Preferred macrocyclic oligomers include macrocyclic polycarbonates, polyesters, polyimides, polyetherimides, polyphenylene ether-polycarbonate co-oligomers, polyetherimide-polycarbonate co-oligomers and blends, compositions and co-oligomers prepared therefrom, more preferably the macrocyclic oligomers include macrocyclic polyesters, polycarbonates or polyphenylene ethers, blends, compositions or co-oligomers thereof, even more preferably the macrocyclic oligomer is a macrocyclic polyester. Preferably, the macrocyclic polyester oligomer contains a structural repeat unit corresponding to the formula

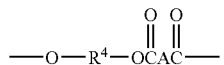

wherein R⁴ is separately in each occurrence alkylene, cycloalkylene, a mono or polyoxyalkylene group and A is separately in each occurrence a divalent aromatic or alicyclic group. Preferably A is a meta or para linked monocyclic aromatic or alicyclic groups. More preferably A is a $C_6$ to $C_{10}$ monocyclic aromatic or alicyclic group.

Preferably, R⁴ is a $C_{2-8}$ alkylene, or mono or polyoxyalkylene groups. Even more preferably, macrocyclic polyester oligomers comprise glycol terephthalates, isophthalates and mixtures thereof, more preferred the macrocyclic oligomers comprise 1,4-butylene terephthalate; 1,3-propylene terephthalate; 1,4-cyclohexylene dimethylene terephthalate, ethylene terephthalate, 1,2-ethylene 2,6-naphthalene dicarboxylate or macrocyclic co-oligomers comprising two or more of the listed macrocyclic oligomers.

Comonomers may be added to the macrocyclic oligomer mixture to adjust the properties of the polymer composition prepared, such as the toughness. The comonomer can be any polyether or polyester based polyol. Among preferred polyols are polytetrahydrofurans, polyalkylene oxide based polyols and polycaprolactones. The comonomers used preferably have a sufficient molecular weight to form a microphase separated rubber particle in the polymeric matrix. The amount of the comonomer used is sufficient to give the desired ductility, softness and/or toughness of the polymer composition prepared. Preferably, the comonomer may be used in an amount of about 1 percent by weight or greater and more preferably about 10 percent by weight or greater. Preferably, the comonomer may be used in an amount of about 60 percent by weight or less, more preferably about 30 percent by weight or less and most preferably about 25 percent by weight or less.

The polymer derived from macrocyclic oligomers is present in the polymeric composition in an amount of about 50 parts by weight or greater based on 100 parts by weight of the polymer composition, more preferably about 65 parts or greater and most preferably about 75 parts by weight or greater. The polymer derived from macrocyclic oligomers is present in the polymeric composition in an amount of about 99 parts by weight or less based on 100 parts by weight of the polymer composition, more preferably about 95 parts or less and most preferably about 80 parts by weight or less. Polymer composition as used herein refers to the entire weight of the prepared polymer composition, which includes organoclay and other auxilliary additives. Derived from in this context means that the resulting polymer was prepared from the recited reactant, for example, macrocyclic oligomer. Such polymers contain the residue of compounds from which they are derived. Residue as used herein means that the polymeric composition contains repeat units which come from the recited reactant, for instance macrocyclic oligomer.

Onium compound as used herein refers to a salt comprising a negatively-charged counter-ion and a positively-charged nitrogen, phosphorus or sulfur compound. In this invention, useful onium compounds are those onium compounds which have at least one ligand with a five carbon atom chain or greater and at least one other ligand containing a functional group having an active hydrogen atom wherein the functional group are capable of reacting with functional groups formed when the macrocyclic oligomer decyclizes.

Furthermore, the onium compound must be able to ionically exchange with simple cations bonded to ion exchange sites on the clay platelets, typically the ions bonded to the ion exchange sites of the clay platelets are sodium or calcium ions. Preferably, the onium compound contains two ligands which have active hydrogen atoms which are capable of reacting with functional groups derived by decyclization of macrocylic oligomers. Preferred onium compounds include amnionium, phosphonium and sulfonium-based compounds. The anion counterion in the onium compound can be any anion which forms a salt with an onium compound and which can be replaced, under conditions of the anion exchange reaction, designed to bond the onium compound ionically to the surface of the clay platelets. Preferably the onium compound corresponds to the formula

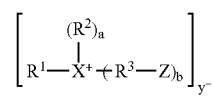

wherein R¹ is independently in each occurrence a $C_5$ or greater straigiht, alicyclic or branched chain hydrocarbyl group,
R² is independently in each occurrence a $C_{1-20}$ ohydrocarbyl group optionally containing one or more heteroatoms;
R³ is a $C_{1-20}$ alkylene or cycloalkylene moiety;
X is a nitrogen, phosphorus or sulfur;
Z is an active hydrogen atom containing functional group;
a is separately in each occurrence an integer of 0, 1 or 2 and
b is an integer of 1 to 3 wherein the sum of a+b is 3 where X is S and 4 where X is N or P.

More preferably X is N. More preferably, R¹ is a $C_{10-20}$ hydrocarbon chain; and most preferably a $C_{12-18}$ alkyl group. More preferably, R² is $C^{1-10}$ ohydrocarbyl and most preferably $C_{1-3}$ alkyl. More preferably, R³ is $C_{1-10}$ alkylene and most preferably $C_{1-3}$ alkylene. More preferably, Z is a primary or secondary amine, thiol, hydroxyl, acid chloride or carboxylic acid, carboxylate ester or glycidyl group; even more preferably a primary amine or hydroxyl group and most preferably a hydroxyl group. More preferably, Y is separately in each occurrence a halogen or sulfate ester (such as alkyl sulfates (preferably methyl sulfate)), and most preferably chlorine or bromine. More preferably, a is an integer of 0 or 1, and most preferably 1. Most preferably, b is 2 or 3.

Preferably, the onium compounds are present in sufficient amount to significantly enhance the dispersion of the clay platelets in the polymeric matrix. Preferably, the sufficient amount of onium compound is present to replace substantially all of the exchangeable cations (usually sodium) in the clay platelets present. Substantially all used in this context means that an occasional clay platelet may contain unexchanged cations. Preferably, the amount of onium compound that has been exchanged for other cations is about 50 percent or greater of the exchangeable cations on the organoclay, more preferably about 75 percent or greater and most preferably about 90 percent or greater. Among preferred onium compounds useful in the invention are quaternary ammonium salts and amine hydrochlorides.

In one embodiment, the compositions of the invention can contain a mixture of onium compounds at least one which has at least one ligand containing a functional group having an active hydrogen atom (active hydrogen onium) compound and at least one which does not contain a reactive functional group (non-functional onium compounds). Generally, the non-functional oniums are well known in the art and comprise ammonium, phosphonium and sulfonium based salts with an anion counterion. Preferably, the ligands on the non-functional oniums are hydrocarbyl or hydrocarbyl moieties containing heteroatoms wherein the ligands do not contain active hydrogen atoms.

Preferably the non-functional onium non-functional compounds correspond to the formula

wherein X is independently in each occurrence N, or P;
$R^{2'}$ is separately in each occurrence a C12ohydrocarbyl group, optionally containing one or more heteroatoms;
Y is a negatively charged counter ion;
And c is 4 where X is N or P and 3 where X is S.

Preferred non-functional onium compounds are disclosed in U.S. Pat. Nos. 5,530,052 and 5,707,439, incorporated herein by reference.

The presence of an active hydrogen containing onium compound improves the dispersion of the clay platelets in the polymer matrix. On the other hand, the presence of the active hydrogen containing onium compound can result in a lower molecular weight of the matrix polymer derived from macrocyclic oligomers. To optimize the heat resistance of the polymeric composition higher levels of active hydrogen containing onium compound can be used. To optimize molecular weight of the polymeric composition, higher levels of non-functional onium compounds may be used. The use of both non-functional onium compounds and active hydrogen containing onium compounds allow the balancing of molecular weight and dispersion of clay platelets in the polymer matrix. The relative amounts of the two kinds of onium compounds can be chosen to give the desired balance of molecular weight and clay platelet dispersion. Preferably, the percentage of the active hydrogen containing onium compound in the total amount of the mixture of onium compounds is about 1 weight percent or greater, more preferably about 10 weight percent or greater and most preferably about 20 weight percent or greater and preferably about 100 percent by weight or less, more preferably about 90 weight percent or less, even more preferably 50 weight percent by weight or less and most preferably about 30 weight percent by weight or less.

Preferably, the percentage of non-functional onium compound is about 99 percent by weight or less, more preferably about 90 percent by weight or less and most preferably 80 percent by weight or less. Preferably, the percentage of non-functional onium compound is about 0 percent by weight or greater, more preferably about 10 percent by weight or greater, even more preferably about 50 percent by weight or greater and most preferably about 70 percent by weight or greater.

The clay platelets useful in this invention are layered minerals or synthetic analogs that are capable of undergoing cation exchange with the onium compounds described herein. Preferably, the clay comprises a natural or synthetic kaolinite, halloysite, serpentine, montmorillonite, beidellite, nontronite, hectorite, stevensite, saponite, illite, kenyaite, magadiite, muscovite, sauconite, vermiculites, volkonskoite, pyrophylites, micas, chlorites, or smectites. There is no limitation with respect to the layered minerals employed in this invention other than that they are capable of undergoing a cation exchange with the cations and/or onium compounds mentioned above. Layered minerals that may be employed in this invention include, those of the kaolinite group, mica group, vermiculite group, the illite group, and the montmorillonite group. Preferably kaolinites can include kaolinite, halloysite, dickite, nacrite and the like. Preferred montmorillonites include montmorillonite, nontronite, beidellite, hectorite, saponite and the like. Preferred minerals of the illite group include hydromicas, phengite, brammalite, glauconite, celadonite and the like. More preferably, the preferred layered minerals include those often referred to as 2:1 layered silicate minerals like muscovite, vermiculite, beidelite, saponite, hectorite and ontmorillonite, wherein montmorillonite is most preferred. In addition to the clays mentioned above, admixtures prepared therefrom may also be employed as well as accessory minerals including, for instance, quartz, biotite, limonite, hydrous micas, feldspar and the like. The layered minerals described above may be synthetically produced by a variety of processes, and are known as synthetic hectorites, saponites, montmorillonites, micas as well as their fluorinated analogs. However, most often they are naturally occurring or commercially available. They are typically prepared via a number of methods which include the hydrolysis and hydration of silicates, gas solid reactions between talc and alkali fluorosilicates, high temperature melts of oxides and fluorides, hydrothermal reactions of fluorides and hydroxides, shale weathering as well as the action of acid clays, humus and inorganic acids on primary silicates.

The clay platelets used preferably have a largest length dimension of about 0.01 microns or greater and most preferably about 0.05 microns or greater. The clay platelets used preferably have a largest length dimension of about 100 microns or less, more preferably about 20 microns or less, even more preferably about 5 microns or less and most preferably about 2 microns or less. Preferably, the clay platelets have an aspect ratio of about 10 or greater, more preferably about 100 or greater and most preferably about 500 or greater. Aspect ratio as used herein means the length of the largest dimension of a platelet divided by the smallest dimension, which is preferably the platelet thickness. The clay platelets are present in the composition in sufficient amount to improve the modulus and heat deflection temperatures to the desired levels discussed hereinbefore. More preferably, the organoclay platelets are present in an amount of about 1 part by weight or greater based on 100 parts of polymer composition, more preferably about 2 parts by weight and most preferably about 5 parts by weight or greater. More preferably, the organoclay platelets are present in an amount of about 30 parts by weight or less based on 100 parts of polymer composition, more preferably about 25 parts by weight or less, even more preferably about 15 parts by weight or less and most preferably about 10 parts by weight or less.

For certain applications, the polymer compositions of the invention may not have adequate molecular weight. Therefore, to enhance the molecular weight of the polymers, a polyfunctional chain extending compound may be added to the composition so as to bond polymer chains together to increase the molecular weight. Any polyfunctional compound which has two or more functional groups which will react with functional groups formed as a result of decyclization of the macrocyclic oligomers may be used. Preferably, the functional groups comprise glycidyl ethers (epoxy compounds), isocyanate moieties, ester moieties, or active hydrogen-containing compounds. More preferably, the functional groups are isocyanate or epoxy, with epoxy functional groups being most preferred. Preferably, the polyfunctional compounds have a functionality of about 2 to about 4, more preferably about 2 to about 3 and most preferably about 2. As used herein, the reference to functionality refers to the theoretical functionality. One skilled in the art would recognize that the actual average number of functional groups in a mixture of compounds may be either more or less than theoretical due to incomplete conversion of compound during preparation, by-products and the like. The amount of coupling agent added to the polymer should be an amount sufficient to achieve the desired molecular weight to give the desired properties. Preferably glycidyl ether based coupling agents are aliphatic or aromatic glycidyl ethers. Preferable isocyanate coupling agents include aromatic or aliphatic diisocyanates. More preferable isocyanate coupling agents include aromatic diisocyanates. The coupling agents, reactive functionality is present in an amount to provide from about 0.25:1 molar equivalents ratio or greater reactive groups to polymer polymer end groups in the polymerized macrocyclic oligomers and most preferably about 0.5 on a theoretical basis. In practice, higher levels are often required due to the presence of side products that consume the coupling agent.

In another embodiment the composition may further comprise the residue of a polyfunctional polymer having the residue of two or more functional groups having active hydrogen atoms wherein the polyfunctional polymer is bonded to the polymer derived from the macrocyclic oligomers. Polyfunctional used herein means that there are at least two functional groups or more present, preferably there are about 2 to about 4 functional groups, more preferably about 2 to about 3 functional groups and most preferably about 2 functional groups for each polymer chain. Preferably, the polymers are chosen such that the polymer has a glass transition temperature significantly lower than the glass transition temperature of the polymer derived from the macrocyclic oligomers. Preferably, the polyfunctional active hydrogen-containing polymer is chosen to improve the ductility of the polymeric composition prepared. Preferably, the polyfunctional active hydrogen-containing polymer has a weight average molecular weight of about 500 or greater, more preferably about 1000 or greater, even more preferably about 5000 or less and most preferably about 10,000. Preferably, the polyfunctional active hydrogen-containing polymer has a weight average molecular weight about 100,000 or less, more preferably about 50,000 or less, even more preferably about 30000 or less and most preferably about 20,000 or less. The polyfunctional active hydrogen-containing polymer can contain any backbone which achieves the desired results of this invention. Preferably, the backbone is an alkylene backbone, cycloalkylene backbone, or a mono or polyoxyalkylene-based backbone. Preferably the backbone is a polyoxyalkylene-based backbone based on alkylene groups between the oxygen in the polyoxyalkylene chain. Preferably, the alkylene groups are $C_{2-4}$ A alkylene groups, i.e, ethylene, propylene or butylene or mixtures thereof. In the event that a mixture of alkylene groups are used, the alkylene groups can be arranged in blocks of similar alkylene groups or arranged in a random fashion. Preferred active hydrogen functional groups are amine and hydroxyl groups, with hydroxyl groups being most preferred. The residue of the polyfunctional polymer containing functional groups having active hydrogen atoms is present in amount of about 5 parts by weight per hundred parts by weight of the polymer present m the composition or greater, more preferably about 10 parts by weight or greater and most preferably about 15 parts by weight or greater. The residue of the polyfunctional polymer containing functional groups having active hydrogen atoms is present in amount of about 40 parts by weight per hundred parts by weight of the polymer present in the composition or less, more preferably about 30 parts by weight or less and most preferably about 25 parts by weight or less. Preferably, the polyfunctional polymer having active hydrogen-containing functional groups is a polyether polyol or polyester polyol.

In yet another embodiment of the invention, the composition may further comprise an impact modifier. Any impact modifier which improves the impact properties and toughness of the polymer composition may be used. Examples of impact modifiers include core shell modifiers, olefinic toughening agents, block copolymers of monovinylidene aromatic compounds and alkadienes, ethylene-propylene diene monomer based polymers. The impact modifiers can be unfunctionalized or functionalized with polar functional groups. Any core shell rubber known to those skilled in the art may be added to the composition. Preferably, the core shell rubber is a functionalized core shell rubber having functional groups on the surface of a core shell rubber. Any functional group which reacts with the macrocyclic oligomer or the functional groups derived from decyclized macrocyclic oligomers may be used. Preferably, the functional groups comprising glycidyl ether moieties or glycidyl acrylate moieties. Preferably, the composition comprises a sufficient amount of core shell rubber to improve the toughness of the polymeric composition. Core-shell rubbers generally contain varying weight fractions of rubber core, generally about 30 to about 90 percent by weight core. Core refers to the center of the core shell rubber which is elastomeric in nature. Preferably the rubber core from the core shell rubber modifier is present in about 5 to 35 parts per weight based on 100 parts by weight of the polymeric composition, preferably 10 to 30 parts and most preferably about 15 to 25 parts. Preferably, a core shell rubber has a surface which contains about 0 percent by weight or greater of a functional group in the shell, and most preferably about 0.5 percent by weight or greater. Preferably, a core shell rubber has a surface which contains about 10 percent by weight or less of a functional group m the shell, and most preferably about 5 percent by weight or less. Percent by weight in reference to functional group on the shell is based upon weight fraction of functional monomer in the shell phase.

The first step in preparing the compositions of the invention is to ion exchange the onium compound with the exchangeable cations associated with the clay platelets. In general, the clay platelets and onium compound are contacted in an aqueous solution under conditions such that the onium compound ion exchanges with cations associated with the clay platelets. Generally, the clay platelets have associated sodium or calcium ions which the onium cations displace. Preferably, the ion exchange is performed at elevated temperatures, preferably at a temperature of about 10° C. or greater, more preferably about 60° C. or greater. Preferably, the ion exchange is done at a temperature of about 90° C. or less and more preferably about 80° C. or less. The contact time is dependent upon temperature and shear rate in the reaction vessel, nevertheless, the contacting generally can result in sufficient ion exchange if contacted for a period of about 24 hours or less.

Acceptable ion exchange can be accomplished in as little time as a few seconds, providing there is sufficient shear and an appropriately configured reactor. Generally, the upper limit of time is controlled by economics, but as a practical manner, a sufficient amount of ion exchange occurs after about 60 minutes or less, more preferably 30 minutes or less. After the ion exchange step has been completed, the ion exchanged clay platelets are isolated from the reaction liquor via suitable methods including filtration or centrifugation, optionally washed to remove traces of salt and then thoroughly dried to remove all water. Optionally, the reaction liquor may be dried directly via suitable methods such as spray drying and the like. The presence of water can cause significant problems during the macrocyclic oligomer polymerization, and therefore, is preferably removed. The drying step can be performed after the exchanged clay is converted to the powdered form.

The next step is to perform an intercalation of the clay platelets. Intercalation means swelling of the clay platelets by contacting them with a material which will cause the clay platelets to move further away from one another. In this invention, the clay platelets are intercalated or swollen by contacting them with molten macrocyclic oligomer. The macrocyclic oligomers should be contacted with the clay platelets at a temperature well below the decyclization and polymerization temperatures of the macrocyclic oligomers. Any temperature at which the macrocylic oligomers are in the molten form and which is below the decyclization and polymerization temperatures may be used. For the system currently under examination, the temperature of contact is preferably about 130° C. or greater, more preferably about 140° C. or greater and most preferably about 150° C. or greater. Preferably, the temperature at which the clay platelets and macrocyclic oligomers are contacted is a temperature of about 190° C. or less, more preferably about 180° C. or less and most preferably about 170° C. or less. Preferably, the macrocyclic oligomers are dried prior to contacting them with the clay platelets. Preferably, the contacting occurs in an inert atmosphere such as in the presence of nitrogen or argon. The materials are contacted for a time sufficient to intercalate the clay platelets. Preferably, the oligomer and clay platelets are contacted for a period of about 2 minutes or greater, more preferably about 10 minutes or greater and most preferably about 15 minutes or greater. Preferably, such contacting occurs for a time period of about 60 minutes or less, more preferably about 40 minutes or less and most preferably about 25 minutes or less.

Preferably, the intercalated or swollen clay has a basal d-spacing of about 20 angstroms or greater, more preferably about 30 angstroms or greater and most preferably about 40 angstroms or greater.

In one embodiment, the intercalated clay macrocyclic oligomer composition is thereafter contacted with a catalyst for polymerization of the composition. In another embodiment, the catalyst can be added to the clay platelets before, or with, the contacting with the onium compound.

Depending upon the functional groups contained in the macrocyclic oligomers, the catalyst will be selected for the appropriate macrocyclic oligomer. The catalyst is added and the composition are preferably mixed for a period of time to disperse the catalyst through the mixture. Thereafter, the mixture is exposed to conditions to raise the mixture's temperature to the temperature at which the macrocyclic oligomers undergo decyclization and polymerization. The selection of the catalysts is driven by the nature of the macrocyclic oligomer, one skilled in the art would recognize suitable catalysts for the various macrocyclic oligomers. In a preferred embodiment, macrocylic oligomer is an ester containing macrocyclic oligomer. In this embodiment, a tin or titanate-based transesterification catalyst may be used. Examples of such catalysts are described in U.S. Pat. No. 5,498,651 and U.S. Pat. No. 5,547,984, the disclosures of which are incorporated herein by reference. Catalysts employed in the invention are those that are capable of catalyzing a transesterification polymerization of a macrocyclic oligomer. One or more catalysts may be used together or sequentially. As with state-of-the-art processes for polymerizing macrocyclic oligomers, organotin and organotitanate compounds are the preferred catalysts, although other catalysts may be used.

Illustrative examples of classes of tin compounds that may be used in the invention include monoalkyltin hydroxide oxides, monoalkyltinchloride dihydroxides, dialkyltin oxides, bistrialkyltin oxides, monoalkyltin trisalkoxides, dialkyltin dialkoxides, trialkyltin, alkoxides, tin compounds having the formula

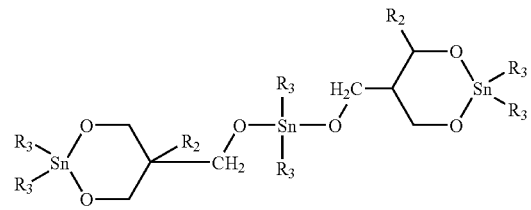

and tin compounds having the formula

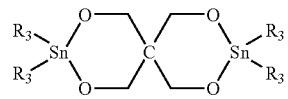

wherein $R_2$ is a $C_{1-4}$ primary alkyl group, and $R_3$ is $C_{1-10}$ alkyl group.

Specific examples of organotin compounds that may be used in this invention include dibutyltin dioxide, 1,1,6,6-tetra-n-butyl-1,6-distanna-2,5,7-10-tetraoxacyclodecane, n-butyltinchloride dihydroxide, di-n-butyltin oxide, dibutyltin dioxide di-n-octyltin oxide, n-butyltin tri-n-butoxide, di-n-butyltin di-n-butoxide, 2,2-di-n-butyl-2-stanna-1,3-dioxacycloheptane, and tributyltin ethoxide. See, e.g., U.S. Pat. No. 5,348,985 to Pearce et al. In addition, tin catalysts described in U.S. Pat. No. 6,420,047 (incorporated by reference) may be used in the polymerization reaction.

Titanate compounds that may be used in the invention include titanate compounds described in U.S. Pat. No. 6,420,047 (incorporated by reference). Illustrative examples include tetraalkyl titanates (e.g., tetra(2-ethylhexyl) titanate, tetraisopropyl titanate, and tetrabutyl titanate), isopropyl titanate, titanate tetraalkoxide. Other illustrative examples include (a) titanate compounds having the formula

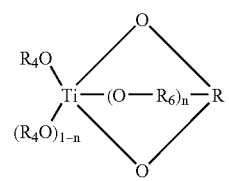

wherein each $R_4$ is independently an alkyl group, or the two $R_4$ groups taken together form a divalent aliphatic hydrocarbon group; $R_5$ is a $C_{2-10}$ divalent or trivalent aliphatic hydrocarbon group; $R_6$ is a methylene or ethylene group; and n is 0 or 1, (b) titanate ester compounds having at least one moiety of the formula

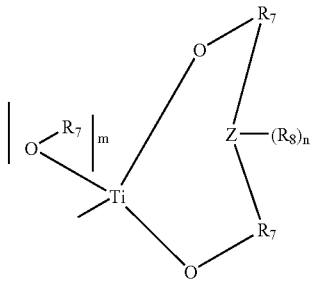

wherein each $R_7$ is independently a $C_{2-3}$ alkylene group; Z is O or N; $R_8$ is a $C_{1-6}$ alkyl group or unsubstituted or substituted phenyl group; provided when Z is O, m–n–0, and when Z is N, m=0 or 1 and m+n=1, and (c) titanate ester compounds having at least one moiety of the formula

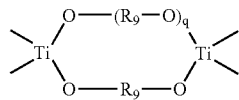

wherein each $R_9$ is independently a $C_{2-6}$ alkylene group; and q is 0 or 1.

The catalyst level should be the lowest level that permits rapid and complete polymerization, and which produces high molecular weight polymer. For the system currently under examination, the mole ratio of transesterification catalyst to macrocyclic oligomer can range from about 0.01 mole percent or greater, more preferably from about 0.1 mole percent or greater and more preferably 0.2 mole percent or greater. The mole ratio of transesterification catalyst to macrocylic oligomer is from about 10 mole percent or less, more preferably 2 mole percent or less, even more preferably about 1 mole percent by weight or less and most preferably 0.6 mole percent or less.

The transesterification or polymerization reaction preferably takes place at a temperature of about 150° C. or greater, more preferably about 170° C. or greater and most preferably 190° C. or greater. Preferably, the polymerization temperature takes place about 300° C. or less, more preferably 250° C. or less, even more preferably 230° C. or less and most preferably 210° C. or less. In a preferred embodiment, the clay is intercalated and/or the macrocyclic oligomers are polymerized under shear conditions. Shear conditions mean that mechanical energy is exerted on the mixture. The preferred level of mechanical energy is that which improves the dispersion of the clay in the polymer matrix without degrading the polymer matrix. Mechanical energy can be provided in a variety of means such as extruding, kneading or mixing and by performing either the intercalation and/or polymerization steps in an extruder or other mixing device.

The polyfunctional active hydrogen-containing polymer can be added during either the intercalation step or just prior to introduction of the catalyst for polymerization where the catalyst is added after containing the ion exchanged clay platelets with the macrocyclic oligomers. The presence of the catalyst for polymerization of the macrocyclic oligomer and/or elevated temperatures are sufficient to drive the reaction of the polyfunctional active hydrogen-containing polymer to react with the macrocylic oligomers after their decyclization.

The polymerization step is preferably conducted under an inert dry atmosphere such as in the presence of anhydrous nitrogen or argon.

After completion of polymerization, a polyfunctional chain extending agent as described hereinbefore may be contacted with the composition. The composition can thereafter be exposed to temperatures at which the chain extension agent reacts with the functional ends of the polymer derived from macrocylic oligomers. No additional catalyst is required and elevated temperatures as described hereinbefore are used for the polymerization.

In another embodiment, the polymerized macrocyclic oligomer may be further polymerized to increase the molecular weight. In one embodiment, this is achieved through solid state polymerization. In solid state polymerization, the polymerized macrocyclic oligomer having clay platelets dispersed therein is exposed to temperatures at which the polymerized mass undergoes advancement through further polymerization. Preferably, such temperatures are about 170° C. or greater, more preferably about 180° C. or greater, most preferably about 195° C. or greater and preferably about 220° C. or less, more preferably about 210° C. or less and most preferably 205° C. or less. The solid state polymerization is preferably performed in a non-oxidizing environment such as under a nitrogen or argon atmosphere. Preferably, the process is performed under vacuum and/or flowing to remove volatile components generated in the polymerization inert gas. The polymerized mass is exposed to solid state polymerization conditions for a sufficient time to achieve the desired molecular weight. Preferably, the polymerized macrocyclic oligomer is exposed to polymerization conditions for a period of about 1 hour or greater and more preferably about 2 hours or greater and preferably about 12 hours or less, even more preferably about 10 hours or less and most preferably about 4 hours or less. Preferably, the macrocyclic oligomer is advanced to a weight average molecular weight of about 60,000 or greater, more preferably about 80,000 or greater and most preferably about 100,000 or greater. The molecular weight is based on a polystyrene standard. Preferably, no additional catalyst is used for solid state advancement.

The core-shell modifier is preferably added after the polymerization is complete, in a high shear environment such as an extruder.

Upon completion of preparation of the polymerization of the macrocyclic oligomer, it is preferable that the clay platelets be exfoliated which generally means randomly dispersed in the polymer matrix. Therefore, preferably, the platelets have become disassociated with one another such that the platelets are free to randomly disperse in the polymer matrix. Preferably, there is little or no order detectable in the clay after polymerization. The resulting polymeric composition may be used to prepare molded articles. Such articles can be molded by techniques commonly known in the art, for instance, injection molding, compression molding, thermoforming, blow molding, resin transfer molding, preparation of composites using flame-spray technology such as disclosed in commonly owned contemporaneously filed Near Net Shape Prepreg U.S. Ser. No. 60/435,900, incorporated herein by reference. The polymeric composites or unpolymerized intercalants of the invention can further be used to impregnate glass fibers or glass mats to form composites or may further contain other additives commonly used molded applications such as stabilizers, color concentrates and the like.

An advantage of the composition of the invention is that such compositions can be molded in an injection molding apparatus at relatively low pressures as compared to conventional molding compositions.

Generally, the articles are molded by exposing the compositions of the invention to temperatures at which they are molten and injecting or pouring them into a mold and then applying pressure to form the appropriate shape of the part. The compositions of the invention can be used to make high heat resistant body panels, fuel tanks, powertrain components and structural parts used in automotive applications.

SPECIFIC EMBODIMENTS

The following examples are included for illustrative purposes only and are not intended to limit the scope of invention. Unless otherwise stated, all parts and percentages are by weight.

Preparation of PBT Nanocomposites

EXAMPLE 1

1.5 g CLOISITE 30 A (montmorillonite clay), intercalated with 95 milliequivalents of bis(2-hydroxyethyl, methyl, tallow ammonium chloride/100 g clay, Southern Clay Products) was placed in a 100 mL 2 neck round bottom flask. The flask was evacuated and purged with nitrogen three times. The clay was dried by heating at 85° C. at 2 mm Hg for 20 hours. 30 g of CBT (polybutylene terephthalate) cyclic oligomers (available from Cyclics Corporation) was added to the clay, and the mixture was evacuated/purged with nitrogen three times, then heated under vacuum at 85° C. for 1 hour. The mixture was then heated at 1 60° C. for 1 hour, producing an intercalated clay with basal d-spacing of 46 Angstroms. The melt was heated under vacuum for 20 minutes, then vacuum was released and 0.09 g Titanium (IV) isopropoxide was added as a 25% solution in toluene. The temperature was raised to 190° C., and the material was heated for 45 minutes, yielding a polybutylene terephthalate nanocomposite. The wide angle x-ray scattering data shows no clay structure and transmission electron microscopy showed that the clay was dispersed predominantly as single platelets and stacks of 2-4 layers. In Example 1 the composition was prepared with minimal shear (prepared in a lab pot).

EXAMPLES 2-4 AND COMPARATIVE EXAMPLE 1-6

The same process as described in Example 1 was performed with the following differences. In all of these examples the catalyst used was butyltin dihydroxy chloride. In Examples 2 and 3 the compositions were reacted with post reaction shear (prepared in a lab pot and extruded). In Comparative Example 1, the composition was formed from unreactive clay with post reaction shear (prepared in a lab pot, then extruded). In Comparative Examples 2 and 3 a prepolymerized high Mw polybutylene terephthalate (PBT) was extruded with reactive clay. In Comparative Example 4 high Mw prepolymerized PBT was extruded with unreactive clay. In Comparative Example 4 the composites was made by dry blending high molecular weight PBT and clay, then extruding the mixture in a twin screw extruder. In Comparative Example 5 and 6 unmodified PBTs containing no organoclay were tested. CLOISITE 30 B is montmorilonite clay, intercalated with 95 milliequivalents of bis(2-hydroxyethyl, methyl, tallow ammonium chloride/100 g clay, Southern Clay Products. SOMASIF MEE is flouromica organoclay, intercalated with bis(2-hydroxyethyl, methyl, cocoalkyl ammonium chloride. Claytone APA is an unreactive clay.

Heat deflection temperature (temperature at which the molded composition deforms) was determined under a load of 66 psi (ASTM-D648) according to the test. Samples were also tested for tensile modulus according to ASTM-D638 test. The results are compiled in Table 1. CBT is cyclic butylene terephthalate. VALOX 315 and VALOX 195 are high molecular weight polybutylene terephthalate.

TABLE 1

| Example | Polyester | Clay | Onium | DTUL 66 PSI ° F. | T Modulus PSI |
|---|---|---|---|---|---|
| 2 | CBT | 5% CLOISITE 30 B | (a) | 344 | 507400 |
| 3 | CBT | 5% SOMASIF MEE | (c) | 362 | 548200 |
| Comparative Example 1 | CBT | 5% CLAYTONE APA | (b) | 303 | 434900 |
| Comparative Example 2 | Valox 315 | 5% CLOISITE 30 B | (a) | 319 | 429700 |
| Comparative Example 3 | Valox 315 | 5% SOMASIF MEE | (c) | 330 | 448500 |
| Comparative Example 4 | Valox 315 | 5% CLAYTONE APA | (b) | 304 | 441700 |
| Comparative Example 5 | Valox 315 PBT | | | 268 | 353000 |
| Comparative Example 6 | Valox 195 PBT | | | 268 | 375000 |

(a) methyl, tallow, bis hydroxyethylammonium chloride
(b) dimethyl, benzyl, hydrogenated tallow ammonium chloride
(c) methyl, cocoalkyl, bis hydroxyethylammonium chloride The examples demonstrate the presence of clays in the polymer matrix with reactive sites improved the tested properties. With reactive sites means that the clay has undergone ion exchange with an ammonium cation having reactive sites which are reactive with macrocyclic oligoesters. Composites prepared by polymerizing CBT with clays dispersed therein exhibit better properties than composites prepared by mixing polyesters and clays.

EXAMPLE 5

15 g CLOISITE 30 B (montmorollonite clay), intercalated with 95 milliequivalents of bis(2-hydroxyethyl, methyl, tallow ammonium chloride/100 g clay, Southern Clay Products) were placed in a 1000 mL two neck round bottom flask, and dried at 110° C. at 2mm Hg for 16 hours, 285 g of dry CBT cyclic oligomers (available from Cyclics Corporation) were added to the clay along with 0.57 g IRGANOX 101 (available from Ciba-Geigy). The CBT cyclic oligomers had been dried by heating at 110° C. at 2mm Hg for 16 hours. The mixture was evacuated/purged with nitrogen three times, then heated at 160° C. with agitation from an overhead stirrer for 45 minutes. The resulting clay, intercalated with cyclic butylene terephthalate, had a basal d-spacing of 32 Angstroms. The melt was heated under vacuum for 10 minutes, then vacuum was released and 0.4 mol percent Sn (872.4 mg) was added in the form of butyltin chloride dihydroxide (Sigma-Aldrich). The mixture was allowed to mix for 5 minutes. The flask was transferred to a 250° C. bath, and the material was heated with agitation for 15 minutes, yielding a polybutylene terephthalate nanocomposite. The nanocomposite was cooled to room temperature, then ground into pellets. The CBT molecular weight was measured by GPC and the Mn was 25,500 and the Mw was 56,600 using a polystyrene standard.

EXAMPLE 6

The procedure for Example 5 was used with 30 g SOMASIF MEE (flouromica organoclay, intercalated with bis(2-hydroxyethyl, methyl, cocoalkyl ammonium chloride/100 g clay, (Co-op Chemical Company, Limited) and 270 g PBT cyclic oligomers. The resulting CBT had molecular weight of Mn=12,800, Mw=25,500.

EXAMPLE 7

The nanocomposite prepared in Example 5 was dried for 16 hours at 110° C. at 2 mm Hg then 30 g placed into a 100 mL one neck round bottom flask along with 0.67 mmol (0.2275 g) bisphenol A diglycidyl ether. The mixture was evacuated/purged with nitrogens three times. The flask was then placed into a 250° C. bath with agitation for 35 minutes. The melt was heated under vacuum for 10 minutes, then vacuum was released and the sample was removed to cool. The resulting material was then analyzed by GPC and the Mn was determined to be 33,500 and the Mw was 102,000.

EXAMPLE 8

The nanocomposite prepared in Example 6 was dried for 16 hours at 110° C. at 2 mm Hg then 30 g placed into a 100 mL one neck round bottom flask along with 1.16 mmol (0.3956 g) bisphenol A diglycidyl ether. The mixture was evacuated/purged with nitrogen three times. The flask was then placed into a 250° C. bath with agitation for 35 minutes. The melt was heated under vacuum for 10 minutes, then vacuum was released and sample was removed to cool. The resulting material was then analyzed by GPC and the Mn was determined to 43,300 and the Mw was 181,000.

EXAMPLE 9

Examples 7 and 8 were repeated with other nanocomposites and bisphenol A diglycidyl ether levels. The nanocomposite, bisphenol A diglycidyl ether levels and molecular weights are compiled in Table 2.

TABLE 2

| Sample | MMOL Coupler | Nano % | Mn Initial | Mn After Coupling | Mw Initial | Mw After Coupling |
|---|---|---|---|---|---|---|
| A | 0.23 | 5% CLOISITE | 25,500 | 36,300 | 56,600 | 105,000 |
| B* | 0.67 | 5% CLOISITE | 25,500 | 33,500 | 56,600 | 102,000 |
| C | 1.98 | 5% CLOISITE | 25,500 | 30,600 | 56,600 | 106,000 |
| D | 0.32 | 10% CLOISITE | 17,800 | 18,200 | 35,800 | 51,700 |
| E | 0.96 | 10% CLOISITE | 17,800 | 19,100 | 35,800 | 62,300 |
| F | 2.88 | 10% CLOISITE | 17,800 | 17,300 | 35,800 | 80,900 |
| G | 0.38 | 10% SOMASIF | 12,800 | 40,700 | 29,200 | 156,000 |
| H** | 1.16 | 10% SOMASIF | 12,800 | 43,300 | 29,200 | 181,000 |
| I | 3.46 | 10% SOMASIF | 12,800 | 22,600 | 29,200 | 140,000 |

*B is Example 7.
**H is Example 8

The procedure for Example 7 was followed, except 0.67 mmol (0.1693 g) of 3,4-epoxycyclohexylmethyl 3,4-epoxycyclohexanecarboxylate was substituted for DER 332 (Bisphenol A based diglycidyl ether). The resulting material was then analyzed by GPC and the Mn was determined to be 27,400 and the Mw was 75,100.

EXAMPLE 10

The procedure for Example 11 was followed, except 1.14 mmol (0.2880 g) of 3,4-epoxycyclohexylmethyl 3,4-epoxycyclohexanecarboxylate was substituted for bisphenol A diglycidyl ether. The resulting material was then analyzed by GPC and the Mn was determined to be 39,100 and the Mw was 229,000.

EXAMPLE 11

The procedure for Example 8 was followed, except 1.14 mmol (0.2880 g) of 3,4-epoxycyclohexylmethyl 3,4-epoxycyclohexanecarboxylate was substituted for bisphenol A diglycidyl ether. The resulting material was then analyzed by GPC and the Mn was determined to be 39,100 and the Mw was 229,000.

EXAMPLE 12

Examples 10 and 11 were repeated with other nanocomposites and/or amounts 3,4-epoxycyclohexyl methyl 3,4-epoxyhexane carboxylate. The results of Examples 10 to 12 are compiled in Table 3.

TABLE 3

| Sample | MMOL Coupler | Nano % | Mn Initial | Mn After Coupling | Mw Initial | Mw After Coupling |
|---|---|---|---|---|---|---|
| A | 0.22 | 5% CLOISITE | 25,500 | 23,700 | 56,600 | 58,800 |
| B* | 0.67 | 5% CLOISITE | 25,500 | 27,400 | 56,600 | 75,100 |
| C | 2.01 | 5% CLOISITE | 25,500 | 23,500 | 56,600 | 69,200 |
| D | 0.33 | 10% CLOISITE | 17,800 | 15,800 | 35,800 | 43,800 |
| E | 0.98 | 10% CLOISITE | 17,800 | 14,000 | 35,800 | 40,000 |
| F | 2.89 | 10% CLOISITE | 17,800 | 15,800 | 35,800 | 48,400 |
| G | 0.39 | 10% SOMASIF | 12,800 | 42,300 | 29,200 | 140,000 |
| H** | 1.14 | 10% SOMASIF | 12,800 | 39,100 | 29,200 | 229,000 |
| I | 3.46 | 10% SOMASIF | 12,800 | 23,600 | 29,200 | 127,000 |

*B is Example 10
**H is Example 11

EXAMPLE 13

The procedure for Example 7 was followed, except 1.98 mmol (0.4956 g) of methylene bis)phenyl isocyanate) was substituted for bisphenol A diglycidyl ether. The resulting material was then analyzed by GPC and the Mn was determined to be 47,100 and Mw was 112,000.

EXAMPLE 14

The procedure for Example 11 was followed, except 3.47 mmol (0.8680 g) of methylene bis(phenyl isocyanate) was substituted bisphenol A diglycidyl ether. The resulting material was then analyzed by GPC and the Mn was determined to be 27,100 and the Mw was 74,400.

EXAMPLE 15

The procedures of Examples 13 and 14 are repeated using different nanocomposites and/or amounts of methylene bis (phenyl isocyanate). The results of Examples 13 to 15 are compiled in Table 4.

TABLE 4

| Sample | MMOL Coupler | Nano % | Mn Initial | Mn After Coupling | Mw Initial | Mw After Coupling |
|---|---|---|---|---|---|---|
| A | 0.22 | 5% CLOISITE | 25,500 | 35,100 | 56,600 | 82,200 |
| B | 0.66 | 5% CLOISITE | 25,500 | 39,600 | 56,600 | 86,600 |
| C* | 1.98 | 5% CLOISITE | 25,500 | 47,100 | 56,600 | 112,000 |
| D | 0.32 | 10% CLOISITE | 17,800 | 24,300 | 35,800 | 48,600 |
| E | 0.96 | 10% CLOISITE | 17,800 | 23,000 | 35,800 | 47,400 |
| F | 2.88 | 10% CLOISITE | 17,800 | 26,200 | 35,800 | 58,000 |
| G | 0.38 | 10% SOMASIF | 12,800 | 21,500 | 29,200 | 50,700 |
| H | 1.16 | 10% SOMASIF | 12,800 | 20,600 | 29,200 | 53,000 |
| I** | 3.47 | 10% SOMASIF | 12,800 | 27,100 | 29,200 | 74,400 |

*C is Example 13
**I is Example 14

EXAMPLE 16

The procedure for Example 7 was followed, except 0.66 mmole (0.1469 g) of HQ-DGE (hydroquinone diglycidyl ether) was substituted for bisphenol A diglycidyl ether. The resulting material was then analyzed by GPC and the Mn was determined to be 39,000 and the Mw was 108,000.

EXAMPLE 17

The procedure for Example 11 was followed, except 1.16 mmol (0.2572 g) of HQ-DGE was substituted for bisphenol A diglycidyl ether. The resulting material was then analyzed by GPC and the Mn was determined to be 40,700 and the Mw was 239,000.

EXAMPLE 18

Examples 16 and 17 were repeated except the nanocomposite and/or the amount of HQ-DGE was varied. The results of Examples 16 to 18 are compiled in Table 5.

TABLE 5

| Sample | MMOL Coupler | Nano % | Mn Initial | Mn After Coupling | Mw Initial | Mw After Coupling |
|---|---|---|---|---|---|---|
| A | 0.23 | 5% CLOISITE | 25,500 | 34,800 | 56,600 | 87,600 |
| B | 0.66 | 5% CLOISITE | 25,500 | 39,000 | 56,800 | 108,000 |
| C | 2.01 | 5% CLOISITE | 25,500 | 30,600 | 56,600 | 105,000 |
| D | 0.33 | 10% CLOISITE | 17,800 | 20,000 | 35,800 | 50,600 |
| E | 0.96 | 10% CLOISITE | 17,800 | 21,100 | 35,800 | 59,700 |
| F | 2.87 | 10% CLOISITE | 17,800 | 22,800 | 35,800 | 74,200 |
| G | 0.39 | 10% SOMASIF | 12,800 | 43,200 | 29,200 | 147,000 |
| H | 1.16 | 10% SOMASIF | 12,800 | 40,700 | 29,200 | 239,000 |
| I | 3.47 | 10% SOMASIF | 12,800 | 27,700 | 29,200 | 86,700 |

EXAMPLE 19

Nanocomposite Reinforced PBT-block-polypropylene Oxide 6.08 g polypropylene glycol Mw~12,000 (ACCLAIM polyol 12200) was placed in a 100 mL two neck round bottom flask along with Irgafos 168 (tris (2,3-di-tert-butylphenyl)phosphite, Ciba-Geigy) and Irganox 1010 (terakis (methylene(3,5-tert-butyl-4-hydroxylhydrocinnamate) methane and pentaerytritol tris ester with 3,5-di-tert-butyl-4-hydroxyphenyl)propionic acid, Ciba Geigy, then 1.0285 g CLOISITE 30 (amontmorillonite clay, intercalated with 95 milliequival bis(2-hydroxyethyl, methyl, tallow ammonium hydrochloride/100 g clay, southern Clay Products) was added followed by 24.02 g of PBT cyclic oligomers (available from Cyclics Corporation). The flask was placed in a 25° C. vacuum oven and dried for 16 hours at 2 mm Hg. The mixture was evacuated/purged with nitrogen three times. The mixture was then heated at 160° C. in an oil bath while being mixed by an overhead stirrer for 38 minutes, producing an intercalated clay with basal d-spacing of 32 Angstroms. The resulting melt was heated under vacuum for 7 minutes, then vacuum was released and mixing resumed for 16 minutes. Butyltin chloride dihydroxide (0.1346 g) was added and the mixture was allowed to mix for 5 minutes. The flask was transferred to a 250° C. salt bath, and the material was heated with agitation for 10 minutes, yielding polybutylene terephthalate block copolymer nanocomposite. The flask was removed and allowed to cool. The isolated polymer had Mn=23,000 and Mw=43,000.

EXAMPLE 20

Another copolymer was made using the method of Example 15, substituting polycaprolactone (6.00 g) for the polyol and omitting the IRGANOX and IRGAFOS, resulting in a copolymer nanocomposite having a Mw of 43,000 and Mn of 17,300 by GPC.

COMPARATIVE EXAMPLE 7

PBT was also prepared by the method of Example 15 omitting the clay. This resulted in a block copolymer nanocomposite with a Mw of 88,100 and Mn of 16,200 by GPC.

Samples from Examples 19, 20 and Comparative Example 7 were examined by transmission electron microscopy (TEM). The polymer matrix showed phase separated discontinuous regions of polyol in continuous regions of polyester. The TEM analyses of Examples 19 and 20 polymer matrices showed the clay dispersed in the polymer matrix.

EXAMPLE 21

94.6 parts of CBT oligomer (grade XBO, supplied by Cyclics Corporation) was mixed with 5 parts organo-clay and 0.4 parts catalyst. The organo-clay, (an alkyl quaternary ammonium bentonite) was supplied by Southern Clay Products and the grade designation was CLOISITE 30B. The dihydroxy functionalized organic modifier was methyl-tallowalkyl-bishydroxyethyl ammonium chloride (Tallow (~65% C18;~30% C16; ~5% C14), and it was present in a concentration of 95 meq/100 g clay. The distanoxane catalyst was 1,1,6,6-tetrabutyl-1,6-di-stana-2,5,7,10-tetraoxacyclodecane. The materials were supplied as powders, physically mixed together, dried overnight at 90° C. in vacuo, and used as feedstock for reactive extrusion.

This example employed a fully intermeshing co-rotating twin screw extruder manufactured by Krupp Werner Pfleiderer Corporation (Model ZSK-25, Machine Number 181234). It is a 25-mm screw diameter mega compounder having a length to diameter ratio of 60. The extruder was equipped with two hole 3-mm strand die, water bath and pelletizer to produce resin in pellet form.

The materials were starve-fed into the extruder using screw type powder feeders. The extruder conditions are summarized in Table 6.

TABLE 6

Reactive Extrusion Conditions

Barrel Temp (° C.)

| Zone 1 | 60 |
| Zone 2 | 120 |
| Zone 3 | 200 |
| Zones 4-17 | 250 |
| Die Temp (° C.) | 250 |
| Screw RPM | 100 |
| % Torque | 15 |
| Die Pressure (psi) | 210 |
| Extrusion Rate (lb/hr) | 10 |

The materials were dried (overnight at 90° C. in vacuo), and injection molded using a 90 ton Toyo injection molding machine equipped with a standard test specimen mold. Relevant molding conditions are shown in Table 7.

The material produced was solid state advanced in a vacuum oven manufactured by American Gold (Model DP-41). The set temperature was 210° C., however, the actual temperature of the resin was determined to be approximately 185° C. The oven was operated under hard vacuum and the advancement time was 8.0 hours.

The advanced resin was subsequently injection molded using a 28-ton Arburg injection molding equipped with a standard test specimen mold. Relevant molding conditions are shown in Table 3. The properties of the unadvanced and advanced molded samples are listed in Table 7.

TABLE 7

| | As Extruded | Solid State Advanced |
|---|---|---|
| SEC Data Percent Conversion | 73 | 98.6* |
| Molecular Weight (Weight Average) | 46,600 | 78,700 |
| Injection Molding Conditions Barrel Temp (° C.) | | |
| Zone 1 | 238 | 250 |
| Zone 2 | 241 | 260 |
| Zone 3 | 243 | 260 |
| Zone 4 | 243 | N/A |
| Nozzle | 241 | 285 |
| Mold Temp (° C.) | 40 | 82 |
| Hold Time (s) | 17 | 11.5 |
| Cool Time (s) | 25 | 20 |
| Mechanical Properties | | |
| Tensile Mod psi | 423,000 | 510,000 |
| Tensile Strength psi | 5140 | 9000 |
| Percent Elong | 1.70 | 4.00 |
| DTUL* | 226 | 316 |

*ASTM D-64888

EXAMPLE 22

303.9 g of SOMASIF ME-100 fluoromica clay (sodium form, 120 meq/100 g ion exchange capacity, Co-Op Chemical Company was slowly added to 7200 g DI (deionized) water 12 L baffled reactor while the mixture was stirred at 400 rpm by an overhead stirrer. This was stirred overnight thus hydrating the clay. The next day the reactor was wrapped in insulation and heated up to 80° C., and the mixing speed was increased to 600 rpm. Once up to temperature a solution of 19.40 g ETHOQUAD T 12/PG (tallowalkyl, bishydroxyethyl, methyl ammonium chloride in propylene glycol from Akzo Nobel and 168.27 g ARQUAD DMHTB (dimethyl, hydrogenated tallowalkyl, benzyl ammonium chloride in isopropanol, from Akzo Nobel) in 500 g ethanol) was added to the reactor. This was allowed to mix at elevated temperature for 4 hours, then the heat was turned off, the speed reduced to 500 rpm and allowed to mix overnight. The stirrer was then turned off and the filtration process was started by pouring the clay solution into a Buchner funnel with Fisherbrand qualitative P5 filter paper (Fisher Scientific). This funnel sits atop a large flask attached to a vacuum line, with the vacuum being supplied by an aspirator. Once the water was pulled through the clay a 2 L water rinse was applied and allowed to rinse the clay. The conductivity of each rinse was measured to determine how much salt was still in the system. The rinsing was repeated at least 3 times or until the conductivity of the filtrate was less than 200 microSiemens/cm. Once the water rinsing was complete, the clay cake was washed twice with 2 L portions of ethanol to remove any excess quaternary ammonium compound that may still be absorbed on the organoclay. The clay cake was then placed in two 9×13×2 inch metal pans and spread out to increase the surface area. The pans were then placed in a hood to evaporate the ethanol for 2 days. The pans were then placed in a 50° C. convection oven overnight to dry the clay. Once dry the clay was then ground in a coarse grinder before being placed in a ball mill jar containing ½ inch alumina milling media. After two hours of ball milling, the clay was sieved through a 120 mesh sieve to give the desired fine powder.

CBT and organoclay were dried overnight under hard vacuum at 90° C. 380 g dried CBT and 20 g dried organoclay were placed into a 1000 mL-two neck round bottom flask with a stir paddle attached. The flask was immersed in a 160° C. molten salt bath and allowed to mix at 100 rpm for 45 minutes under a nitrogen pad. A slight vacuum was pulled and then increased to a hard vacuum to limit foaming and degas the system. 1.165 g of butyltin dichloride was added and the mixture allowed to mix for 5 minutes. The flask was transferred to a 250° C. molten salt and stirred at 100 rpm until the motor was unable to stir due to the increase in viscosity. After 10 minutes in the high temperature bath, the flask was removed and allowed to cool to room temperature.

This procedure was repeated for three other samples using varied amounts of active hydrogen containing onium compounds (functional) and non-functional onium compounds.

The molecular weight of each sample were measured by GPC using a polystyrene standard. Plaques were molded from each sample and tested for heat deflection temperature (DTUL) according to ASTM D-64888. The results are compiled in Table 8.

TABLE 8

| Sample | Percent Non-Functional Quaternary Ammonium | Percent Functional Quaternary Ammonium | 66 PSI DTUL of (° C.) | Weight Average Molecular Weight |
| --- | --- | --- | --- | --- |
| A | 0 | 100 | 356 (180) | 55000 |
| B | 50 | 50 | 337 (169) | 72000 |
| C | 90 | 10 | 335 (168) | 117000 |
| D | 100 | 0 | 321 (161) | 124000 |

What is claimed is:

1. A composition comprising:
   a) a polymer derived from a polyester macrocyclic oligomer, having dispersed therein;
   b) clay platelets comprising fluoromica wherein the polymer present is covalently bonded to c) one or more onium compounds having at least one ligand containing a carbon chain of $C_5$ or greater and at least one ligand with moieties containing one or more hydroxyl groups which are reactive with the macrocyclic oligomer and/or functional groups formed by decyclizing the macrocylic oligomer and one or more onium compounds is ionically bonded to the clay platelets.

2. A composition comprising:
   a) a polymer derived from a macrocyclic polyester oligomer;
   b) clay platelets comprising fluoromica; and
   c) the residue of one or more onium compounds having at least one ligand with a $C_5$ or greater carbon chain and at least one ligand containing one or more hydroxyl functional groups wherein the functional group is reactive with the macrocyclic oligomer and/or functional groups formed when the macrocyclic oligomer decyclizes wherein a portion of one or more of the onium compounds is ionically bound to the clay platelet and covalently bonded to the polymer derived from the macrocyclic oligomer.

3. The composition according to claim 2 wherein the onium compound corresponds to the formula

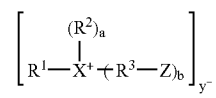

wherein:
  X is independently in each occurrence N, S or P;
  $R^1$ is independently in each occurrence a $C_5$ or greater straight or branched chain hydrocarbyl group,
  $R^2$ is independently in each occurrence a $C_{1-20}$ hydrocarbyl group optionally containing one or more heteroatoms;
  $R^3$ is a $C_{1-20}$ alkylene or cycloalkylene moiety;
  Y is a negatively charged counter ion;
  Z is a hydroxyl group;
  a is separately in each occurrence an integer of 0, 1 or 2; and
  b is an integer of 1 to 3.

4. The composition according to claim 2 wherein the macrocyclic oligomer is a macrocyclic polyester oligomer comprising glycol terephthalate, isophthalates or mixtures thereof.

5. The composition according to claim 2 wherein the clay is present in an amount of from about 1 to about 30 parts by weight based on the weight of the polymer composition.

6. The composition according to claim 2 wherein the composition further comprises the residue of a polyfunctional chain extender compound which is bonded to two or more polymer chains wherein the polyfunctional chain extender compound comprises two or more functional groups which are reactive with functional groups formed by decyclization of the macrocyclic oligomer.

7. The composition according to claim 2 wherein the composition further comprises the residue of a polyfunctional polymer having the residue of two or more functional groups having active hydrogen atoms wherein the polyfunctional polymer is bonded to the polymer derived from the macrocyclic oligomer.

8. The composition according to claim 7 wherein the polyfunctional polymer having the residue of two or more functional groups containing active hydrogen atoms has a glass transition temperature of 0° C. or less.

9. The composition according to claim 8 wherein the residue of the polyfunctional polymer containing functional groups having active hydrogen atoms is present in an amount of about 5 to about 49 parts by weight per 100 parts of polymer present in the composition.

10. The composition according to claim 2 wherein the composition further contains a non-functional onium compound.

11. A composition according to claim 6 wherein the polyfunctional chain extender compound has functional groups which comprise glycidyl ether, isocyanate or ester functional groups.

12. A composition according to claim 11 wherein the polyfunctional chain extender compound has functional groups which comprise glycidyl ether or isocyanate functional groups.

13. A composition according to claim 2 wherein the macrocyclic polyester oligomer contains a structural repeat unit corresponding to the formula

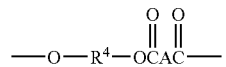

wherein:

R$^4$ is separately in each occurrence alkylene, cycloalkylene, a mono or polyoxyalkylene group; and A is separately in each occurrence a divalent aromatic or alicyclic group.

14. A composition according to claim 13 wherein:

A is separately in each occurrence a meta or para monocyclic aromatic or alicyclic group.

15. A composition comprising:

a) a polymer derived from a macrocyclic polyester oligomer;

b) clay platelets comprising fluoromica; and c) the residue of one or more onium compounds having at least one ligand with a C$_5$ or greater carbon chain and at least one ligand containing one or more hydroxyl functional groups wherein the functional group is reactive with the macrocyclic oligomer and/or functional groups formed when the macrocyclic oligomer decyclizes wherein a portion of one or more of the onium compounds is ionically bound to the clay platelet and covalently bonded to the polymer derived from the macrocyclic oligomer wherein the onium compound corresponds to the formula

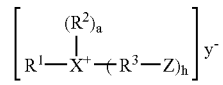

wherein:

X is independently in each occurrence N, S or P:

R$^1$ is independently in each occurrence a C$_5$ or greater straight or branched chain hydrocarbyl group, R$^2$ is independently in each occurrence a C$_{1-20}$ hydrocorbyl group optionally containing one or more heteroatoms;

R$^3$ is a C$_{1-20}$ alkylene or cycloalkylene moiety;

Y is a negatively charged counter ion;

Z is a hydroxyl group:

a is separately in each occurrence an integer of 0, 1 or 2 and b is an integer of 2 or 3.

16. The composition according to claim 15 wherein the macrocyclic oligomer is a macrocyclic polyester oligomer comprising glycol terephthalate, isophthalates or mixtures thereof.

17. The composition according to claim 15 wherein the clay is present in an amount of from about 1 to about 30 parts by weight based on the weight of the polymer composition.

18. The composition according to claim 15 wherein the composition further comprises the residue of a polyfunctional chain extender compound which is bonded to two or mote polymer chains wherein the polyfunctional chain extender compound comprises two or more functional groups which are reactive with functional groups formed by decyclization of the macrocyclic oligomer.

19. The composition according to claim 15 wherein the composition further comprises the residue of a polyfunctional polymer having the residue of two or more functional groups having active hydrogen atoms wherein the polyfunctional polymer is bonded to the polymer derived from the macrocyclic oligomer.

20. The composition according to claim 19 wherein the polyfunctional polymer having the residue of two or more functional groups containing active hydrogen atoms has a glass transition temperature of 0° C. or less.

21. The composition according to claim 20 wherein the residue of the polyfunctional polymer containing functional groups having active hydrogen atoms is present in an amount of about 5 to about 49 parts by weight per 100 parts of polymer present in the composition.

22. The composition according to claim 15 wherein the composition further contains a non-functional onium compound.

23. A composition on according to claim 18 wherein the polyfunctional chain extender compound has functional groups which comprise glycidyl ether, isocyanate or ester functional groups.

* * * * *